(12) United States Patent  
Uhrick et al.

(10) Patent No.: US 9,120,632 B2
(45) Date of Patent: Sep. 1, 2015

(54) SCRAP METAL LOADER APPARATUS AND METHOD OF OPERATION

(75) Inventors: Michael R. Uhrick, Dallas, TX (US); Ronnie L. Latham, Kemp, TX (US)

(73) Assignee: Venture Metals Machinery, LLC, Dallas, TX (US)

(*) Notice: Subject to any disclaimer, the term of this patent is extended or adjusted under 35 U.S.C. 154(b) by 775 days.

(21) Appl. No.: 12/913,574

(22) Filed: Oct. 27, 2010

(65) Prior Publication Data

US 2012/0107075 A1    May 3, 2012

(51) Int. Cl.
*B65G 67/30* (2006.01)
*B65G 67/20* (2006.01)
*B65F 9/00* (2006.01)

(52) U.S. Cl.
CPC .. *B65G 67/20* (2013.01); *B65F 9/00* (2013.01)

(58) Field of Classification Search
CPC ...................................................... B65G 67/20
USPC ...................... 414/400, 508, 809; 296/190.01
See application file for complete search history.

(56) References Cited

U.S. PATENT DOCUMENTS

| 5,044,870 | A  | * | 9/1991  | Foster ........................ 414/809 |
| 5,201,626 | A  |   | 4/1993  | Hansen |
| 5,765,986 | A  | * | 6/1998  | Hulls ........................ 414/809 |
| 5,921,740 | A  |   | 7/1999  | Stewart |
| 5,954,470 | A  | * | 9/1999  | Duell et al. ............... 414/525.6 |
| 7,172,382 | B2 | * | 2/2007  | Frankel ..................... 414/403 |
| 7,275,906 | B1 | * | 10/2007 | Pool ........................ 414/395 |
| 7,744,330 | B2 |   | 6/2010  | Haub et al. |
| 7,837,428 | B2 |   | 11/2010 | Adams et al. |
| 7,866,932 | B1 | * | 1/2011  | Pool ........................ 414/400 |
| 7,967,543 | B2 | * | 6/2011  | Criswell et al. ........... 414/373 |
| 2008/0219818 | A1 | * | 9/2008 | Adams et al. .............. 414/404 |
| 2009/0067952 | A1 | * | 3/2009 | Rhodes et al. .............. 414/12 |
| 2009/0110522 | A1 | * | 4/2009 | Criswell .................... 414/398 |
| 2011/0027060 | A1 | * | 2/2011 | Dunn et al. ................. 414/808 |
| 2011/0182705 | A1 | * | 7/2011 | Bushong ...................... 414/400 |

* cited by examiner

*Primary Examiner* — James Keenan
(74) *Attorney, Agent, or Firm* — Jackson Walker L.L.P.; Christopher J. Rourk (57) ABSTRACT

An apparatus for loading a shipping container comprising a metal trough having a bottom, a front end, a back end and two sidewalls. A push plate disposed at the back end of the metal trough. A force mechanism coupled to the push plate and configured to move the push plate from the back end of the metal trough to the front end of the metal trough. A support mechanism configured to support the metal trough to allow a shipping container to be moved into a position to encompass the metal trough through a door of the shipping container.

20 Claims, 8 Drawing Sheets

SCRAP METAL LOADER APPARATUS AND METHOD OF OPERATION

FIELD OF THE INVENTION

The invention relates to loading of scrap metal into containers, and more particularly to an apparatus and method for loading of scrap metal into containers that prevents damage to the containers and allows the amount of scrap by weight to be precisely monitored.

BACKGROUND OF THE INVENTION

Shipping of non-uniform material such as scrap metal can be accomplished in several manners. The scrap material can be compressed into predetermined shapes, such as cubes, and those shapes can be loaded into shipping containers and stacked based on the approximate dimensions of the shapes. The amount of handling required to ship scrap metal in this manner and the cost of the compression equipment can exceed the savings that may be realized by increasing the volume of scrap that can be shipped in a container. In addition, the cost for shipping a container may be based in whole or in part on weight, which may eliminate the primary incentive to increase the amount of material that can be loaded into a container.

Nevertheless, shipment of uncompressed or loose metal scrap can also be problematic, as such scrap metal can be difficult to load into shipping containers. The non-uniform configuration of the loose metal scrap can result in jagged edges that damage the shipping containers while loading. It can also be difficult to clearly document the weight of the loose metal scrap that has been loaded into a shipping container, and the owner of the shipping container may provide weight measurements that conflict with those of the scrap metal provider.

SUMMARY OF THE INVENTION

An apparatus and method for loading loose scrap metal into a shipping container are provided that prevent the shipping container from being damaged during loading, that facilitate the loading of loose scrap into a shipping container, and that provide additional points at which to measure the weight of the scrap that has been loaded into the shipping container, thus facilitating the shipment of loose/uncompressed scrap.

DETAILED DESCRIPTION OF PREFERRED EMBODIMENTS

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

Figure 1A:
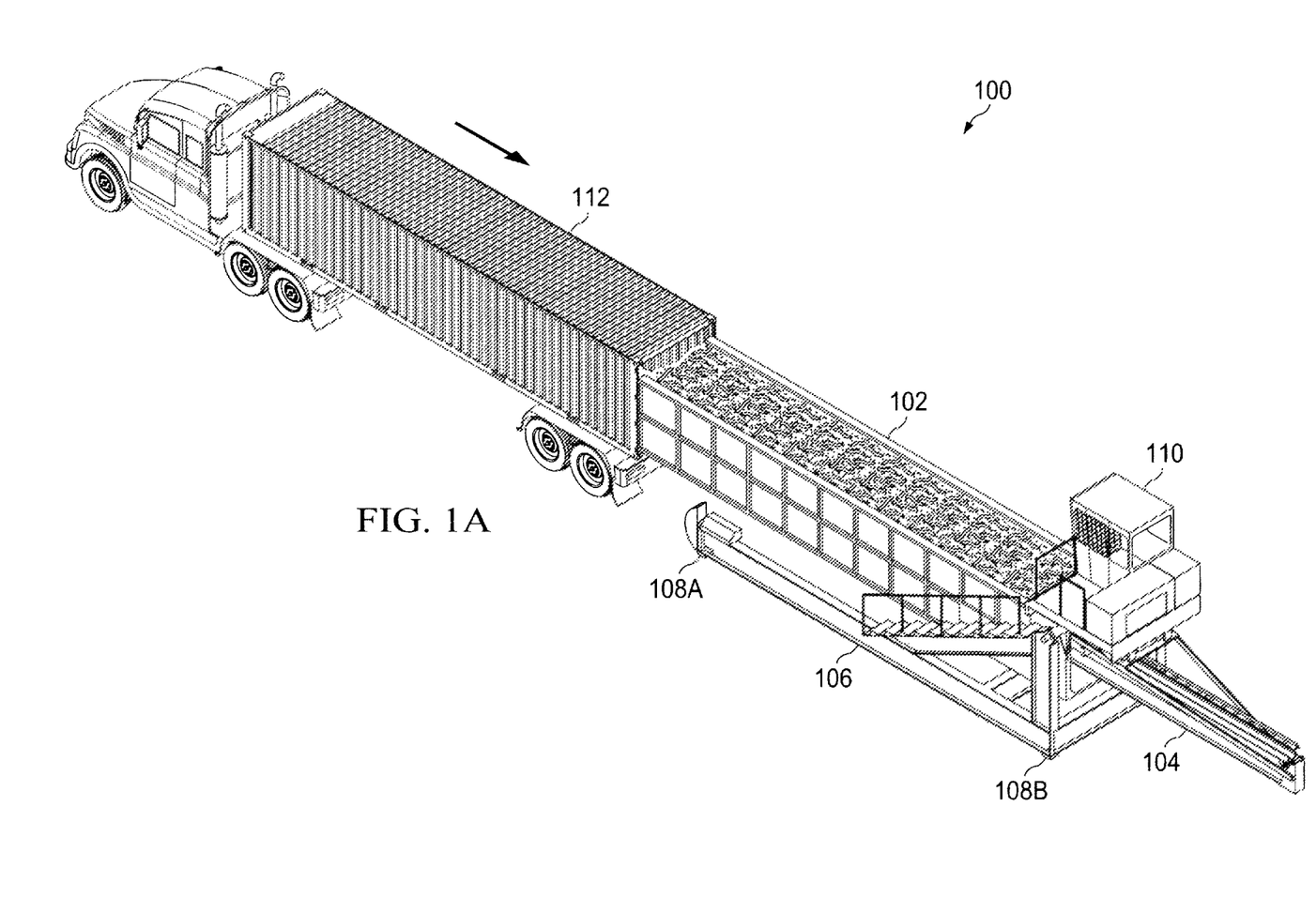
FIG. 1A is a diagram of a system for loading scrap metal into shipping containers in accordance with an exemplary embodiment of the present invention.

FIG. 1A is a diagram of a system 100 for loading scrap metal into shipping containers in accordance with an exemplary embodiment of the present invention. System 100 allows a standard shipping container to be loaded with loose scrap metal or other suitable materials in a manner that prevents the shipping container from being damaged while allowing the exact weight of the scrap metal that has been loaded into the shipping container to be independently verified. While loading and handling of scrap metal is described herein as an example, wood, paper, glass, rock or other suitable materials can also or alternatively be used.

System 100 includes loader 102, which is a metal-walled trough having dimensions that allow loader 102 to be inserted into the cavity of a shipping container. Loader 102 is filled with scrap metal, and is then inserted into shipping container 112, such as by backing shipping container 112 over loader 102 using a tractor-trailer. An adjustment mechanism (not explicitly shown in FIG. 1A) can be used to move loader 102 horizontally, vertically or rotationally, so as to align loader 102 to slide directly into shipping container 112. A swivel, tracks, rollers or other suitable devices can also or alternatively be provided where suitable to loader 102 to allow loader 102 to be readily inserted into shipping container 112.

Loader supports 106 provide support for loader 102, and rest on load cells 108A and 108B. Load cells 108A and 108b can be used to determine the empty weight of loader 102, the weight of loader 102 after it has been filled with scrap, and the weight of loader 102 after shipping container 112 has been completely filled with scrap, to the extent that there is any remaining scrap in loader 102. In this manner, the weight of the scrap metal that has been placed into shipping container 112 from loader 102 can be independently verified.

System 100 also includes control cabin 110 and hydraulic drive 104. Control cabin 110 is situated to allow an operator to observe the operation of loader 102, which is described in further detail herein. Hydraulic drive 104 drives a push plate (not explicitly shown in FIG. 1A) that is used to push loose scrap metal into shipping container 112 from loader 102. A cog drive, an electric motor or other suitable motive devices can also or alternatively be used to apply a motive force to the push plate. Hydraulic, electric or other suitable devices can also be used to position loader 102 in a vertical, horizontal or rotational orientation relative to the shipping container, to apply a vibrational force to loader 102 to disrupt jammed configurations of scrap, or for other suitable purposes.

In operation, system 100 allows a shipping container 112 to be loaded with scrap metal from a loader 102 in a manner that prevents damage to the shipping container 112 and that allows the weight of the scrap metal to be independently verified.

Figure 1B:
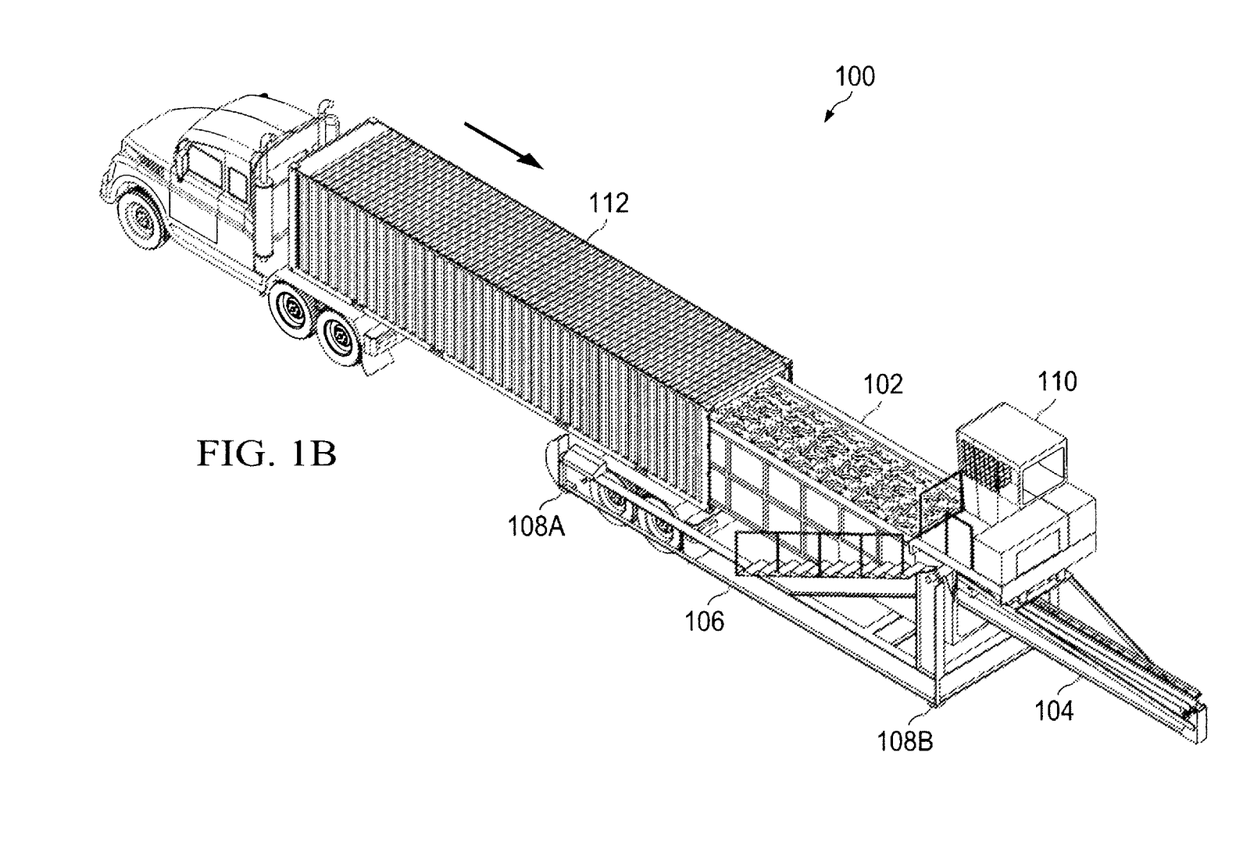
FIG. 1B is a diagram of a system in operation for loading scrap metal into shipping containers in accordance with an exemplary embodiment of the present invention.

FIG. 1B is a diagram of a system 100 in partial operation for loading scrap metal into shipping containers in accordance with an exemplary embodiment of the present invention. In FIG. 1B, shipping container 112 has been moved partially over loader 102, without disturbing the scrap metal contained in loader 102 and without exposing shipping container 112 to any damage from the scrap metal. As previously discussed, rollers, swivels, or vertical and horizontal placement controls can be used to align loader 102 with shipping container 112, and to prevent shipping container 112 from being inadvertently damaged if loader 102 is not perfectly aligned with shipping container 112 or if the driver of the tractor trailer connected to shipping container 112 mistakenly changes direction while moving shipping container 112 into position.

Figure 1C:
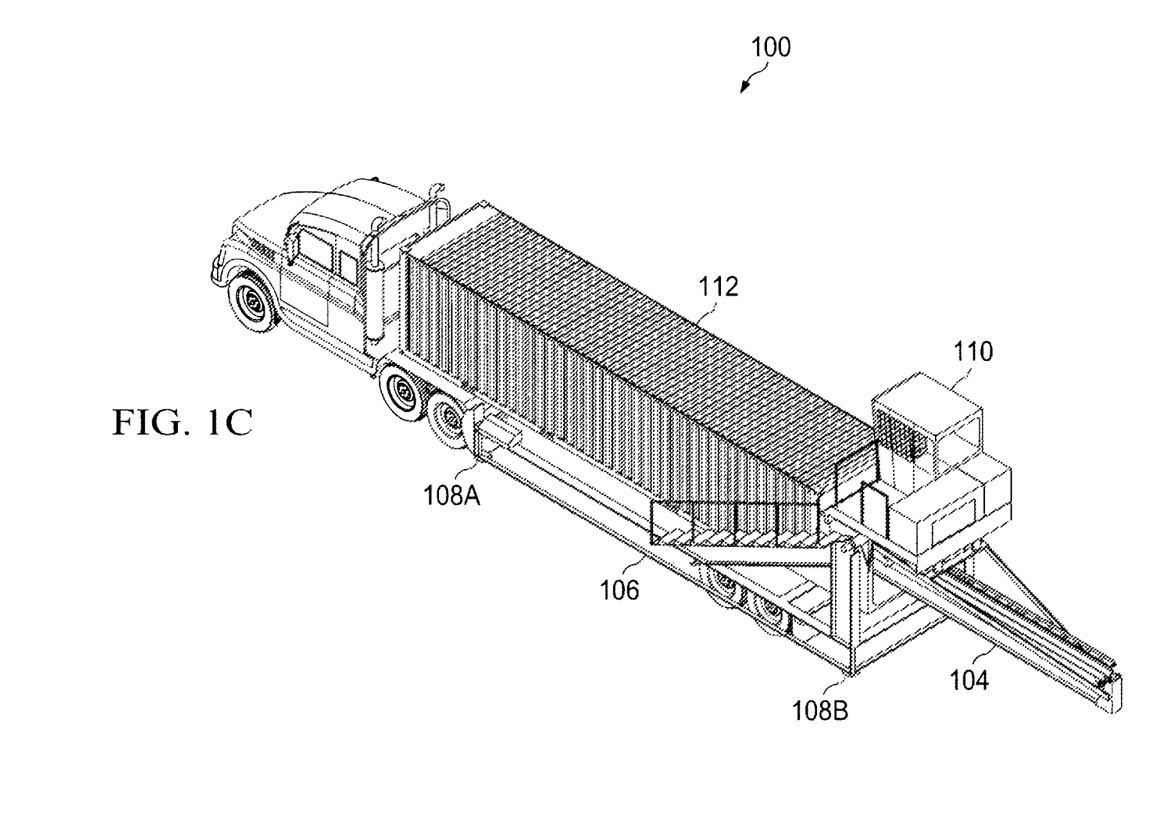
FIG. 1C is a diagram of a system with a shipping container fully encasing a loader, in accordance with an exemplary embodiment of the present invention.

FIG. 1C is a diagram of a system 100 with shipping container 112 fully encasing loader 102, in accordance with an exemplary embodiment of the present invention. Once the tractor trailer holding shipping container 112 has moved shipping container 112 to a position where loader 102 is fully enclosed, the tractor trailer drive train is placed into neutral, to allow the shipping container to move as the scrap metal contained within loader 102 is pushed into shipping container 112 by hydraulic drive 104. In this manner, as the scrap metal is moved into shipping container 112, the operator in control cabin 110 can observe the progress of the loading and can adjust the speed of the hydraulic drive 104 as necessary to avoid pushing shipping container 112 faster than the rate at which the scrap metal is being loaded into shipping container 112, as such loading might be indicative of blockage in the scrap metal assembly that will result in empty space within shipping container 112. Likewise, if shipping container 112 is moving away from loader 102 at a slower rate than the rate at which the scrap metal is being loaded into shipping container 112, that condition can indicate possible damage to shipping container 112, and the operator can reverse the movement of the push plate to disentangle the scrap metal from the damaging configuration. System 100 provides an operator with considerable flexibility to prevent potentially damaging conditions from developing.

Figure 1D:
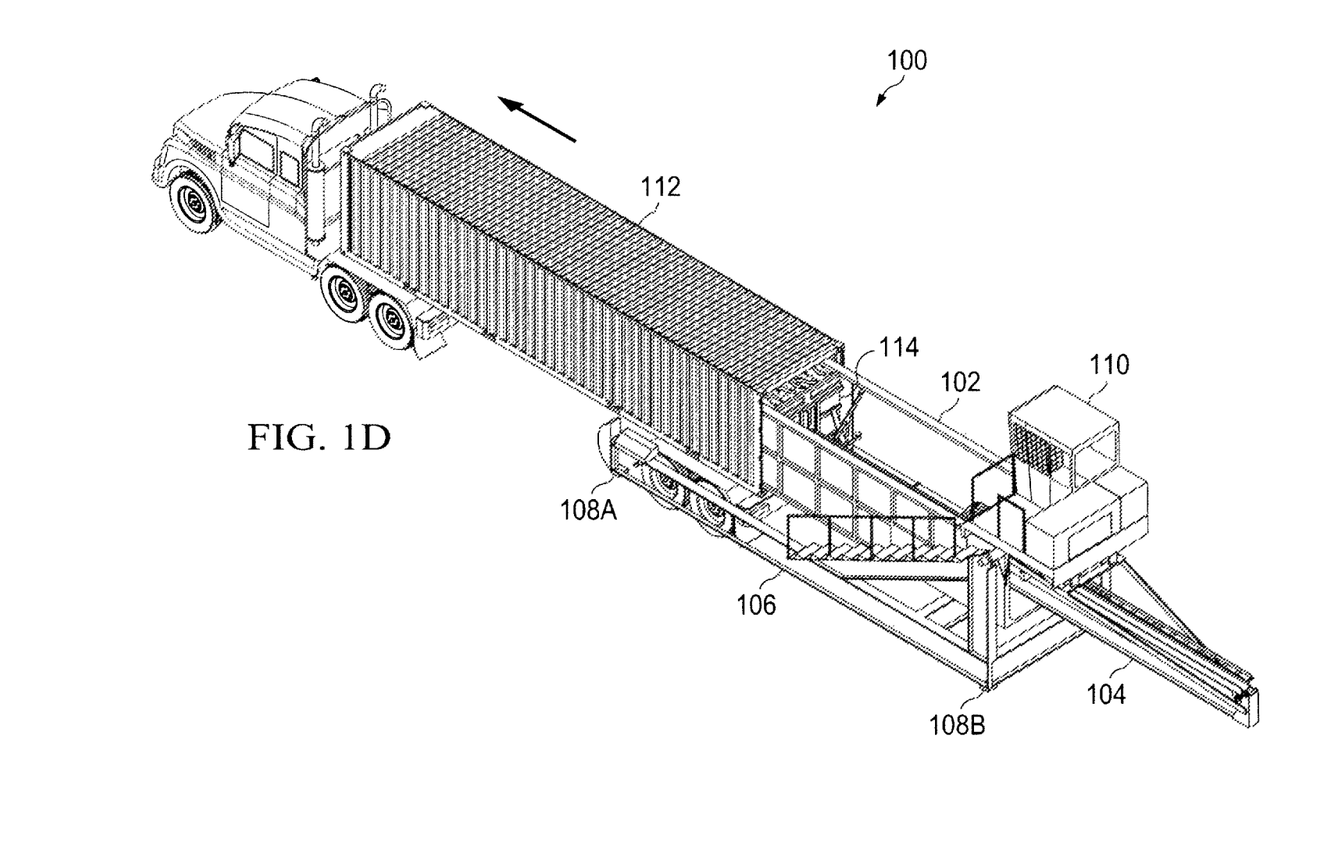
FIG. 1D is a diagram of a system with a shipping container partially loaded with the scrap metal from a loader, in accordance with an exemplary embodiment of the present invention.

FIG. 1D is a diagram of a system 100 with shipping container 112 partially loaded with the scrap metal from loader 102, in accordance with an exemplary embodiment of the present invention. As shown in FIG. 10, shipping container 112 has moved away from fully enclosing loader 102 in response to hydraulic drive 104 moving push plate 114 from the front of loader 102 towards the back of loader 102. Loader 102 is fabricated from heavy gauge metal, unlike shipping container 112 which is fabricated from a lighter gauge metal. As a result, as push plate 114 applies force to the scrap metal in loader 102, the scrap metal moves into shipping container 112 and applies a transmitted force to shipping container 112 from push plate 114, which moves away from push plate 114 because the tractor trailer drive is in neutral. The operator in control cabin 110 can observe the progress of the loading and can adjust the speed of the hydraulic drive 104 as necessary to avoid pushing shipping container 112 faster than the rate at which the scrap metal is being loaded into shipping container 112, or can increase the speed where push plate 114 is closely tracking the movement of shipping container 112 away from loader 102. Likewise, if push plate 114 enters into shipping container 112, which can potentially cause the scrap metal to damage shipping container 112, push plate 114 can be retracted, a vibrator mechanism can be activated to facilitate the movement of scrap metal out of loader 102 and into shipping container 112, or other suitable processes can be implemented.

In addition, the loading of shipping container 112 can be automated, such as by using a metering mechanism to track the position of push plate 114 relative to the end of shipping container 112, the amount of force being applied by push plate 114, or other suitable indicators.

Figure 1E:
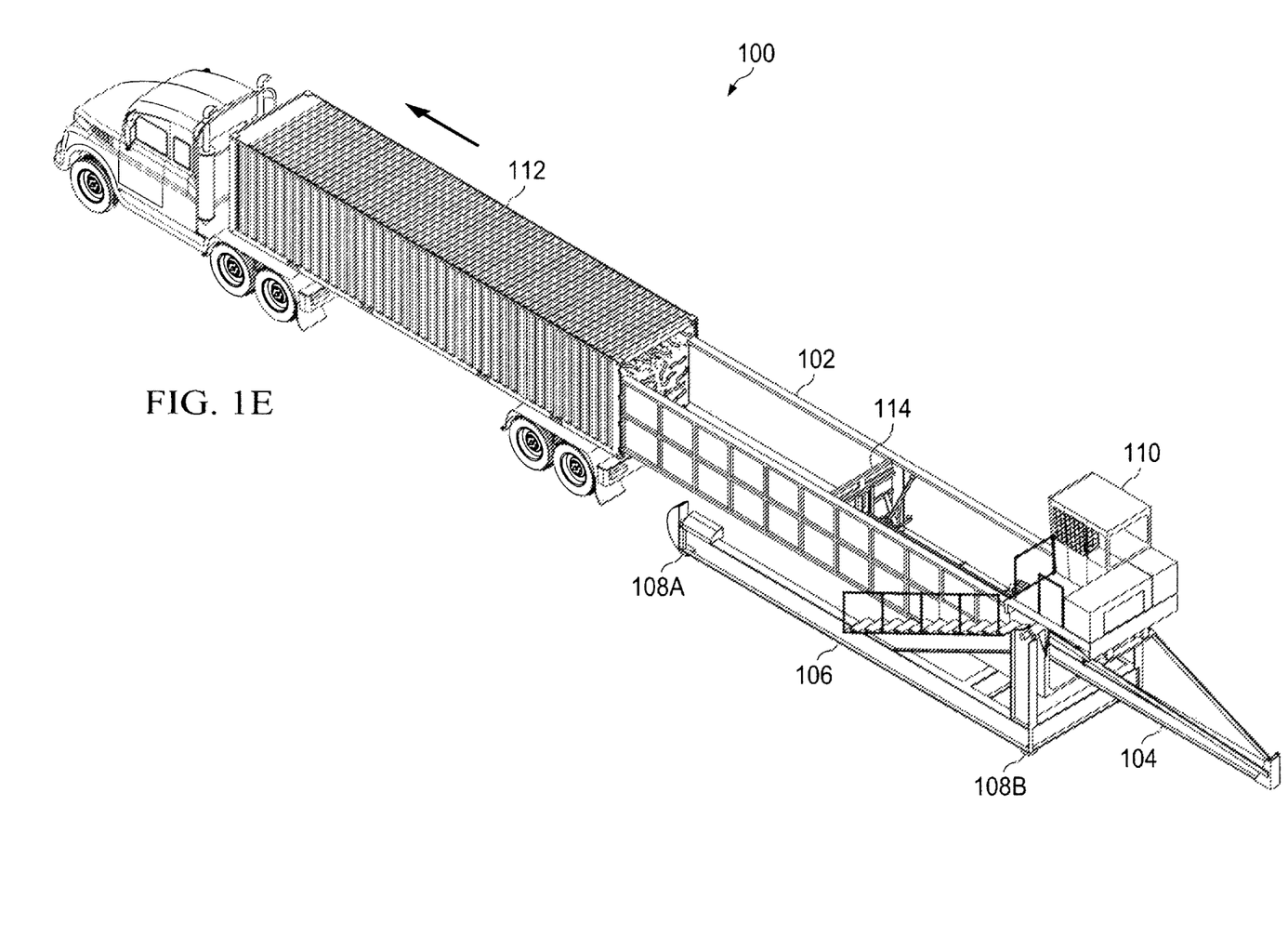
FIG. 1E is a diagram of a system with a shipping container fully loaded with the scrap metal from a loader, in accordance with an exemplary embodiment of the present invention.

FIG. 1E is a diagram of a system 100 with shipping container 112 fully loaded with the scrap metal from loader 102, in accordance with an exemplary embodiment of the present invention. As shown in FIG. 1E, shipping container 112 has moved completely away from loader 102, and push plate 114 is being retracted by hydraulic drive 104 back to a starting position to allow loader 102 to receive a new load of scrap metal. The weight of loader 102 can be determined using load cells 108a and 108B, and this data can be recorded to provide an additional data source for verifying the amount of scrap metal that has been loaded into shipping container 112. While it is common for shipping container 112 to be weighed on a scale or other suitable device both before and after loading, the additional data point for determining the amount of scrap metal that has been loaded can be used if any discrepancies are later noticed. For example, it is possible that scrap may be removed from the shipping container while it is en route, mistakes might be made in the weight amounts reported by the driver of the tractor trailer, or other sources of error may be encountered. Inconsistency between the weights measured using load cells 108a and 108B and other weighing mechanisms can help to identify misoperating equipment, clerical errors, or other sources of discrepancy.

Figure 2A:
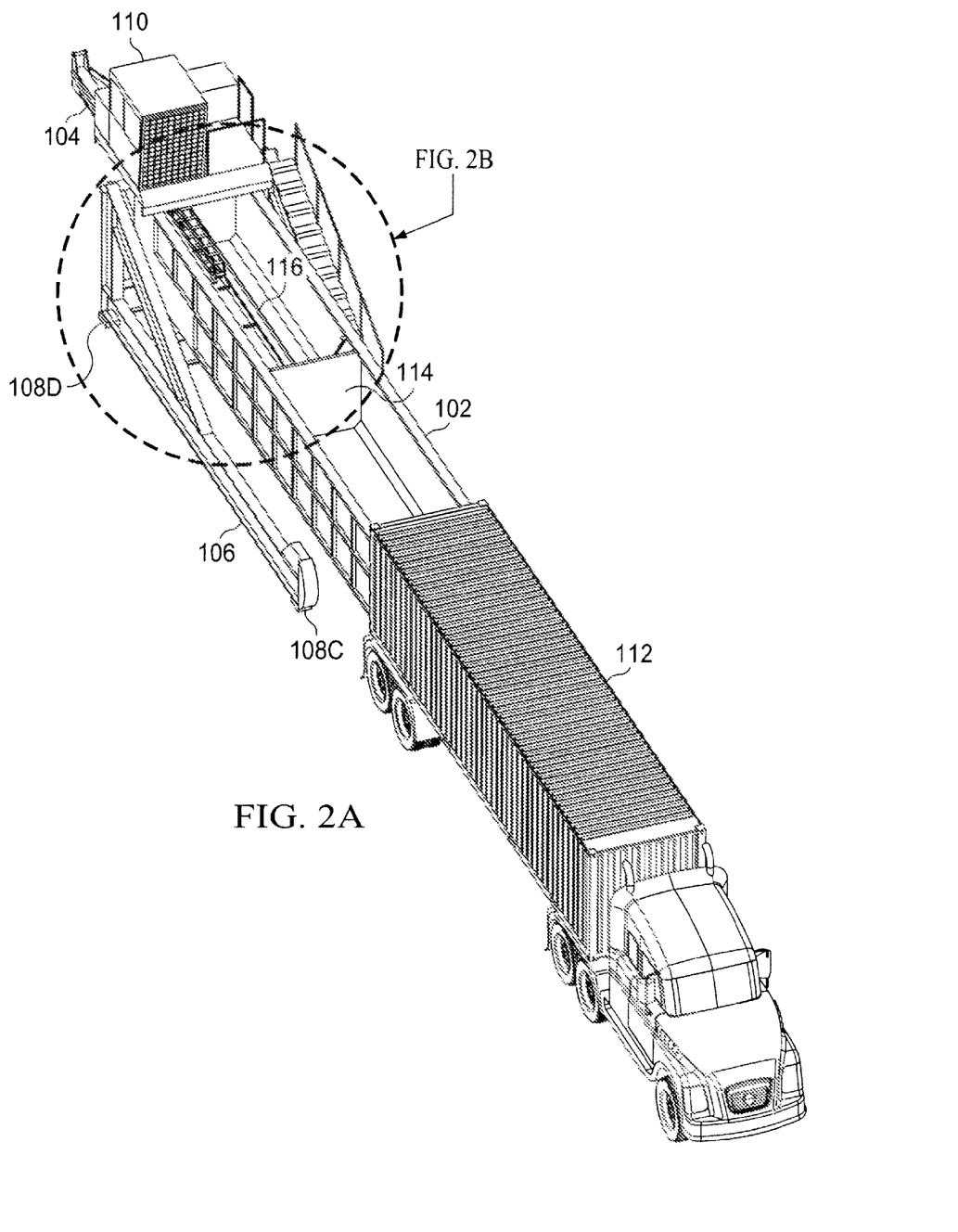
FIGS. 2A and 2B are diagrams showing an alternate view of a shipping container fully loaded with the scrap metal from a loader, in accordance with an exemplary embodiment of the present invention.
Figure 2B:
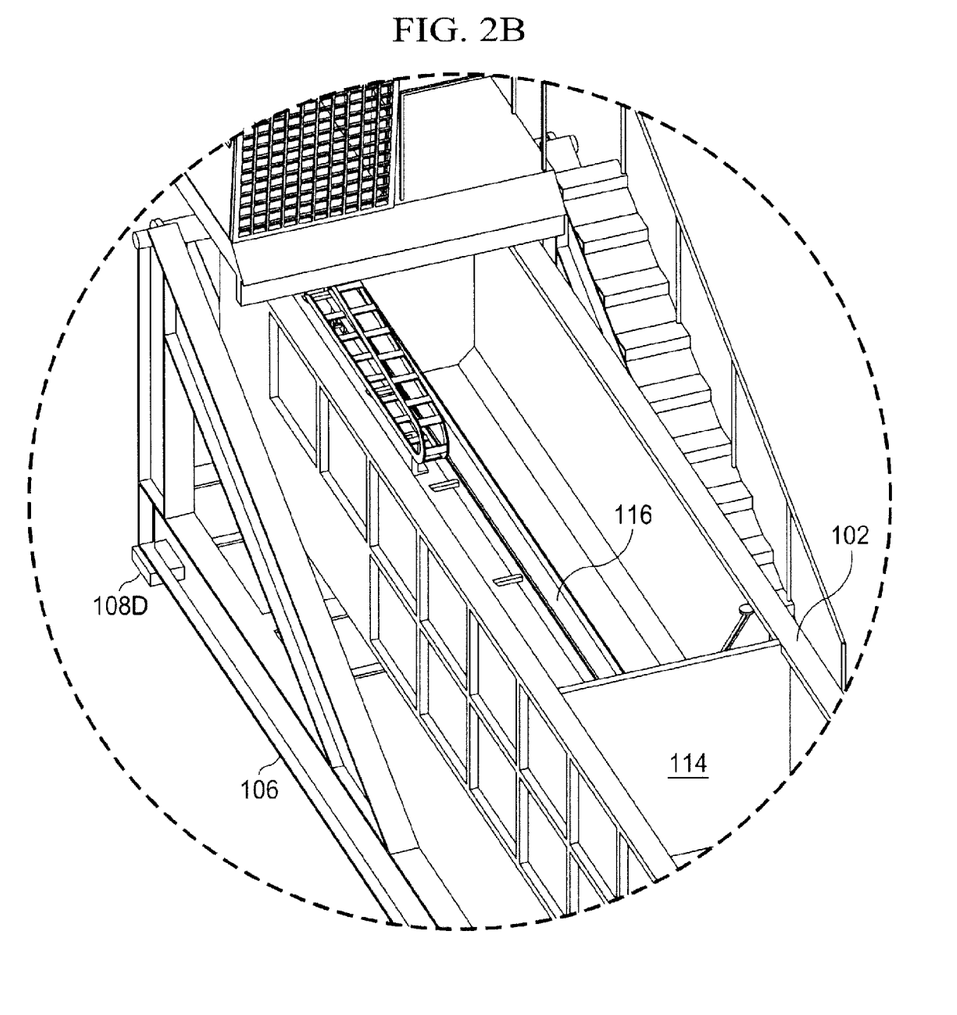

FIGS. 2A and 2B are diagrams showing an alternate view of shipping container 112 fully loaded with the scrap metal from loader 102, in accordance with an exemplary embodiment of the present invention. As shown in FIG. 2A, shipping container 112 has moved completely away from loader 102, and push plate 114 is being retracted by hydraulic mechanism 116. Detail drawing FIG. 2B shows hydraulic mechanism 116 withdrawing push plate 114 back to the loading position. As previously noted, cog drives, electric motors or other suitable mechanisms can be used to provide a motive force to push plate 114.

Figure 3:
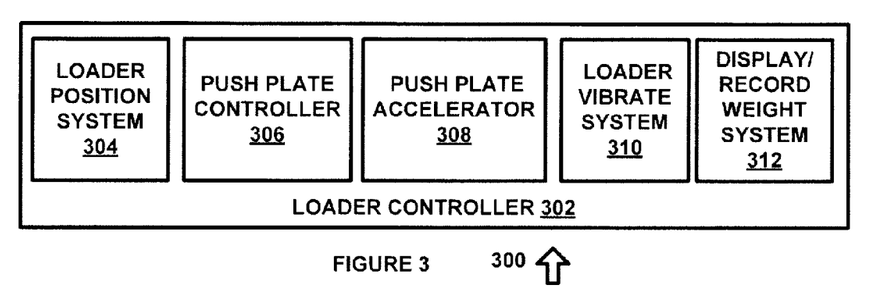
FIG. 3 is a diagram of a system for controlling the operation of a loader in accordance with an exemplary embodiment of the present invention.

FIG. 3 is a diagram of a system 300 for controlling the operation of a loader in accordance with an exemplary embodiment of the present invention. System 300 includes loader controller 302, loader position system 304, push plate controller 306, push plate accelerator 308, loader vibrate system 310 and display/record weight system 312, each of which can be implemented in hardware or a suitable combination of hardware and software, and which can be one or more software systems operating on a general purpose processing platform or mechanical controls within control cabin 110. As used herein and by way of example and not by limitation, "hardware" can include a combination of discrete components, an integrated circuit, an application-specific integrated circuit, a field programmable gate array, a digital signal processor, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Loader position system 304 aligns a loader with a shipping container. In one exemplary embodiment, a user can manually position the loader so that it is aligned with the shipping container, such as by moving the loader up or down, to the left or to the right, by swiveling the loader about a central swivel point, or in other suitable manners. In another exemplary embodiment, the loader and/or shipping container can include one or more sensors that are used to provide position data that is used to adjust the horizontal position, vertical position or angular position of the loader relative to the shipping container.

Push plate controller 306 controls the movement of a push plate to offload scrap metal from a loader into a shipping container. In one exemplary embodiment, a shipping container can be placed in position to enclose the loader, and a user can manually control a push plate using a hydraulic press, such as by moving the push plate forward at a rate that matches the rate at which the shipping container is pushed away from the loader as the scrap in the loader is transferred to the shipping container. Likewise, if the shipping container stops moving relative to the push plate, the user can slow or stop the movement of the push plate to prevent damage to the shipping container. In another exemplary embodiment, load sensors can be used to control the rate at which the push plate is moved, such as to accelerate the push plate when resistance is at a minimum and to slow or stop the push plate if resistance reaches predetermined thresholds.

Push plate accelerator 308 controls the rate at which the push plate is moved, either while being extended or retracted. In one exemplary embodiment, the push plate can be accelerated if no resistance is being encountered while the shipping container is receiving scrap from the loader. In another exemplary embodiment, the push plate can be retracted if resistance to movement is encountered, and can be accelerated into the scrap metal to break any obstructions, such as where the scrap metal has formed an obstruction within the loader.

Loader vibrate system 310 controls a vibrational force on a loader, such as to dislodge jammed scrap while the loader is being used to fill a shipping container. In one exemplary embodiment, loader vibrate system can be used to manually control a vibrational force applied to the loader, such as by pulsing a lateral or horizontal positioning device or by using other suitable devices, such as when a push plate of the loader encounters resistance while loading scrap metal into a shipping container. Likewise, a feedback control can be provided where the push plate is automatically controlled, or other suitable controls can be provided, such as to activate, increase or decrease a vibrational force as a function of an amount of resistance measured by a hydraulic power source that moves the push plate of the loader.

Display/record weight system 312 allows a user to display and record an amount of weight of scrap metal contained within a loader, and additional data such as a date, time, load identifier or other suitable data. Display/record weight system 312 allows the weight of a load of scrap metal that is being loaded into a shipping container to be measured and recorded, such as to address any future discrepancies that may be reported.

In operation, system 300 allows a scrap loader to be controlled to load scrap metal from the loader into a standard shipping container while avoiding damage to the shipping container. System 300 also allows the amount of scrap that has been loaded into the shipping container to be determined and recorded.

Figure 4:
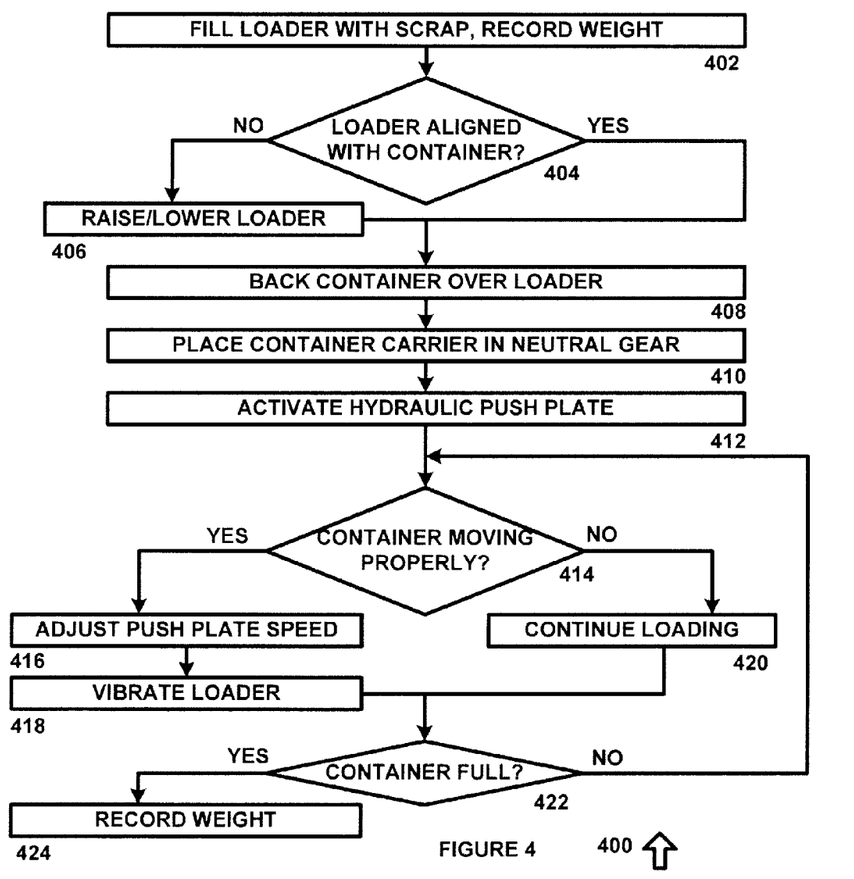
FIG. 4 is a flow chart of an algorithm for controlling the operation of a loader in accordance with an exemplary embodiment of the present invention.

FIG. 4 is a flow chart of an algorithm 400 for controlling the operation of a loader in accordance with an exemplary embodiment of the present invention. Algorithm 400 begins at 402, where a loader is filled with scrap, such as scrap metal, and the increase in the weight of the loader is recorded. The algorithm then proceeds to 404.

At 404, it is determined whether the loader is aligned with a shipping container. If it is determined that the loader is aligned, such as by manual observation or measurement, by using telemetry sensors or in other suitable manners, then the algorithm proceeds to 408. Otherwise, the algorithm proceeds to 406, where the loader is raised, lowered, swiveled, or otherwise adjusted to align the loader with the shipping container. The algorithm then proceeds to 408.

At 408, the shipping container is backed over the loader, such as by moving the shipping container with a tractor trailer or in other suitable manners. The loader is configured to fit within a standard shipping container, so as to allow the shipping container to be backed onto the loader through the shipping container access doors. After the shipping container has fully enclosed the loader, the algorithm proceeds to 410.

At 410, the shipping container carrier, such as a tractor trailer, is placed in a neutral gear, so as to allow the shipping container to move out from the loader as the scrap metal or other materials are pushed into the shipping container from the loader. The algorithm then proceeds to 412, where a hydraulic push plate of the loader is activated. The loader can include a hydraulic mechanism or other suitable motive device that moves the push plate from a front end of the loader towards a back end of the loader, so as to push the scrap metal in the loader into the shipping container. The loader is formed from plate steel having a sufficient gauge to prevent damage from being inflicted on the loader while the scrap metal is pushed into the shipping container, which allows the shipping container (which generally has walls that are of a lighter gauge metal and which may be damaged by scrap metal that is pushed through the container) to receive the metal as it exist the end of the loader without any relative movement between the scrap metal and the shipping container. As the scrap metal exits the loader, it forces the shipping container to move away from the loader, as long as the carrier for the shipping container is in a neutral gear and is able to move in response to the force exerted against the shipping container by the loader push plate as it pushes the scrap metal into the shipping container. The algorithm then proceeds to 414.

At 414, it is determined whether the shipping container is moving properly. For example, if the shipping container is moving away from the loader faster than the scrap metal is being pushed into the shipping container, then the configuration of the scrap metal or other random conditions might be preventing the scrap metal from filling the shipping container properly. Likewise, if the shipping container is moving away from the loader slower than the scrap metal is being pushed into the shipping container, the scrap metal might be causing damage to the shipping container. If the shipping container is moving properly, such as at the same rate as the push plate or at other acceptable speeds, then the algorithm proceeds to 420 where loading continues. Otherwise, the algorithm proceeds to 416, where the push plate speed is adjusted, such as to increase or decrease the push plate speed, to reverse the push plate so as to try and dislodge a blocked scrap metal configuration, or in other suitable manners. The algorithm then proceeds to 418, where the loader is vibrated if a vibrational mechanism is available, such as to dislodge a blocked scrap metal configuration. The algorithm then proceeds to 422.

At 422, it is determined whether the shipping container is full. If the shipping container is not full, such as if the shipping container continues to enclose a portion of the loader and there is remaining scrap metal in the loader, the algorithm returns to 414, otherwise the algorithm proceeds to 424. At 424, the weight of the loader is recorded, so as to generate a record of the amount of scrap that has been loaded into the shipping container.

In operation, algorithm 400 allows a loader to be used to fill a shipping container with scrap metal in a manner that prevents the shipping container from being damaged and that allows the weight of scrap metal that has been loaded into the shipping container to be documented.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. An apparatus for loading a shipping container comprising:
    a metal trough having a bottom, a front end, a back end and two sidewalls;
    a push plate disposed at the back end of the metal trough;
    a force mechanism coupled to the push plate and configured to move the push plate from the back end of the metal trough to the front end of the metal trough; and
    a support mechanism disposed underneath the metal trough and configured to support the metal trough at a single end when the metal trough is fully loaded and having a first vertical assembly fixed to an end of the metal trough and to at least one horizontal loader support that extends along the ground under the metal trough, without additional supports at any point along a length of the metal trough, to allow a shipping container to be moved into a position to encompass the metal trough through a door of the shipping container without the shipping container providing support to the metal trough.

2. The apparatus of claim 1 further comprising an operator's cabin located above the back end of the metal trough and configured to allow an operator to align the metal trough with a shipping container.

3. The apparatus of claim 1 further comprising a controller coupled to the force mechanism and configured to control movement of the push plate.

4. The apparatus of claim 1 further comprising:
    a positioning device coupled to the metal trough; and
    a positioning device controller configured to provide control data to the position device to change an orientation of the metal trough relative to at least one axis.

5. The apparatus of claim 1 further comprising:
    a vibrational device coupled to the metal trough; and
    a vibrational device controller configured to provide control data to the vibrational device to cause the metal trough to be vibrated in a predetermined direction.

6. The apparatus of claim 1 further comprising a weight sensor coupled to the support mechanism, the weight sensor configured to generate weight data for the apparatus.

7. The apparatus of claim 1 further comprising an accelerator control coupled to the force mechanism and configured to vary an acceleration of the push plate.

8. An apparatus for loading a shipping container comprising:
    a metal trough having a bottom, a front end, a back end and two sidewalls;
    a push plate disposed at the back end of the metal trough;
    a force mechanism coupled to the push plate and configured to move the push plate from the back end of the metal trough to the front end of the metal trough; and
    a support mechanism having a first vertical assembly extending above the metal trough and fixed to an end of the metal trough and to a pair of horizontal loader supports that each extend along the ground underneath a length of the metal trough, the support mechanism configured to support the metal trough fully loaded, the support mechanism configured to allow a shipping container to be moved into a position to encompass the metal trough through a door of the shipping container without requiring the shipping container to support the metal trough.

9. The apparatus of claim 8 further comprising an operator's cabin located above the back end of the metal trough and coupled to the vertical assembly.

10. The apparatus of claim 8 further comprising a controller coupled to the force mechanism and configured to control movement of the push plate.

11. The apparatus of claim 8 further comprising:
    a positioning device coupled to the metal trough; and
    a positioning device controller configured to provide control data to the position device to change an orientation of the metal trough relative to at least one axis.

12. The apparatus of claim 8 further comprising:
    a vibrational device coupled to the metal trough; and
    a vibrational device controller configured to provide control data to the vibrational device to cause the metal trough to be vibrated in a predetermined direction.

13. The apparatus of claim 8 further comprising a weight sensor coupled to the support mechanism, the weight sensor configured to generate weight data for the apparatus.

14. The apparatus of claim 8 further comprising an accelerator control coupled to the force mechanism and configured to controllably change an acceleration of the push plate.

15. An apparatus for loading a shipping container comprising:
    a metal trough having a bottom, a front end, a back end and two sidewalls;
    a push plate disposed at the back end of the metal trough;
    a force mechanism coupled to the push plate and configured to move the push plate from the back end of the metal trough to the front end of the metal trough;
    a support mechanism having a first vertical assembly extending above the metal trough and fixed to an end of the metal trough and to a pair of horizontal loader supports that each extend along the ground underneath a length of the metal trough, the support mechanism configured to support the metal trough fully loaded, the support mechanism configured to allow a shipping container to be moved into a position to encompass the metal trough through a door of the shipping container without requiring the shipping container to support the metal trough;

an operator's cabin located above the back end of the metal trough and coupled to the vertical assembly;

a positioning device coupled to the metal trough; and a positioning device controller configured to provide control data to the position device to change an orientation of the metal trough relative to at least one axis.

16. The apparatus of claim 15 further comprising a controller coupled to the force mechanism and configured to control movement of the push plate.

17. The apparatus of claim 15 further comprising:

a vibrational device coupled to the metal trough; and a vibrational device controller configured to provide control data to the vibrational device to cause the metal trough to be vibrated in a predetermined direction.

18. The apparatus of claim 15 further comprising a weight sensor coupled to the support mechanism, the weight sensor configured to generate weight data for the apparatus.

19. The apparatus of claim 15 further comprising an accelerator control coupled to the force mechanism and configured to vary an acceleration of the push plate.

20. The apparatus of claim 15 further comprising an accelerator control coupled to the force mechanism and configured to controllably change an acceleration of the push plate.

* * * * *

UNITED STATES PATENT AND TRADEMARK OFFICE
CERTIFICATE OF CORRECTION

| | |
|---|---|
| PATENT NO. | : 9,120,632 B2 |
| APPLICATION NO. | : 12/913574 |
| DATED | : September 1, 2015 |
| INVENTOR(S) | : Michael R. Uhrick and Ronnie L. Latham |

It is certified that error appears in the above-identified patent and that said Letters Patent is hereby corrected as shown below:

In the claims
Column 7, line 61, replace "position" with "positioning"
Column 9, line 5, replace "position" with "positioning"

Signed and Sealed this
Ninth Day of February, 2016

Michelle K. Lee
*Director of the United States Patent and Trademark Office*